United States Patent [19]
Wells et al.

[11] Patent Number: 5,088,208
[45] Date of Patent: Feb. 18, 1992

[54] MEASUREMENT PROBE FOR POSITION DETERMINING APPARATUS

[75] Inventors: Peter J. Wells, Stonehouse; David G. Powley, Alveston; Richard H. Lewis, Horfield, all of United Kingdom

[73] Assignee: Renishaw, plc, Gloucestershire, United Kingdom

[21] Appl. No.: 476,377

[22] PCT Filed: Oct. 11, 1989

[86] PCT No.: PCT/GB89/01197
§ 371 Date: May 24, 1990
§ 102(e) Date: May 24, 1990

[87] PCT Pub. No.: WO90/04149
PCT Pub. Date: Apr. 19, 1990

[30] Foreign Application Priority Data
Oct. 11, 1988 [GB] United Kingdom ............... 8823811
Sep. 12, 1989 [GB] United Kingdom ............... 8920559

[51] Int. Cl.⁵ ............................................. G01B 7/03
[52] U.S. Cl. ............................................. 33/559; 33/561; 33/1 M
[58] Field of Search ............... 33/503, 504, 1 M, 556, 33/558, 559, 561, 572

[56] References Cited

U.S. PATENT DOCUMENTS

| | | |
|---|---|---|
| 3,869,799 | 3/1975 | Neuer et al. |
| 3,945,124 | 3/1976 | Jacoby et al. |
| 4,078,314 | 3/1978 | McMurtry ............ 33/1 M |
| 4,305,207 | 12/1981 | Lantz ............ 33/503 |
| 4,477,978 | 10/1984 | Azuma ............ 33/1 M |
| 4,530,159 | 7/1985 | Ernst ............ 33/503 |
| 4,535,543 | 8/1985 | Linder ............ 33/556 |
| 4,716,656 | 1/1988 | Maddock et al. ............ 33/503 |
| 4,841,644 | 6/1989 | Bertz ............ 33/556 |
| 4,910,446 | 3/1990 | McMurtry et al. ............ 33/503 |
| 4,959,542 | 9/1990 | Stephens . |

FOREIGN PATENT DOCUMENTS

| | | |
|---|---|---|
| 0128561 | 12/1984 | European Pat. Off. . |
| 2535249 | 2/1977 | Fed. Rep. of Germany . |
| 05435 | 6/1989 | PCT Int'l Appl. . |
| 2129133 | 5/1984 | United Kingdom ............ 33/556 |
| 2163256 | 2/1986 | United Kingdom . |

*Primary Examiner*—William A. Cuchlinski, Jr.
*Assistant Examiner*—C. W. Fulton
*Attorney, Agent, or Firm*—Oliff & Berridge

[57] ABSTRACT

A measurement probe for use on machine tools or coordinate measuring machines has a stylus (12) mounted in a probe body (10), for displacement in each of the axes x,y,z. On each axis, the relative motion is supported by a pair of cylindrical linear bearings, which are parallel to each other and spaced apart. The bearings comprise a shaft (30) and concentric sleeve (26), between which is located a cage (28) of ball bearings. The arrangement achieves good performance in a relatively small housing.

17 Claims, 5 Drawing Sheets

MEASUREMENT PROBE FOR POSITION DETERMINING APPARATUS

BACKGROUND OF THE INVENTION

This invention relates to measuring probes for use in apparatus in which a determination is made of the position of a surface of a workpiece. Such apparatus includes machine tools and coordinate measuring machines.

A known type of such probe comprises a stylus for contacting the workpiece surface, which is movable in three orthogonal directions x,y,z relative to a probe body. The stylus is biassed to a null position in each of these directions by springs. The probe also contains means for measuring the displacement of the stylus in each of these directions. In use, the probe is mounted in position determining apparatus (such as a machine tool or coordinate measuring machine) on a quill or spindle which is itself movable in the directions x,y,z relative to the workpiece. With the stylus touching the workpiece surface, the coordinates of the point of contact are obtained by adding the x,y,z outputs of the probe to x,y,z readings of the position of the quill or spindle. Such probes can be used to scan the contour of a workpiece surface, the probe being moved with its stylus in continuous contact with the surface.

It is known to provide such a probe with a linear bearing arrangement for each axis of movement x,y,z. For example, one probe available from the Japanese company Mitutoyo uses a linear air bearing for each axis. This has the advantage of low friction, which is an important factor in a successful measurement probe intended for scanning purposes. However, the use of air bearings not only entails the disadvantage of requiring an air supply. There is also a practical limit to the load capacity and stiffness of an air bearing of a given size, and the biassing springs need to have a relatively low spring rate. Low load capacity limits the size of stylus that can be carried by the probe. Low stiffness limits the static accuracy of the probe, since any deformation will cause an inaccurate reading. Furthermore, the low stiffness and low spring rate affect the probe's dynamic performance. The movable part of this known probe has a relatively low natural frequency of vibration (around 3Hz). This limits the maximum scanning speed at which the probe can scan a workpiece surface with accuracy and without risk of momentary loss of contact.

Another probe has been suggested in EP-A-0128561 (Mecof). Instead of air bearings, this probe uses ball or roller bearings in each of the three axes x,y,z. The x and y axes each have a parallel pair of linear bearings, each comprising a groove in which are located balls or crossed rollers. The z axis has a single cylindrical linear ball bearing. However, in the design of such a probe, one needs to consider the loading capability of the bearings, their stiffness, and their friction. The loading capability affects the ability of the bearing to provide a reaction to the bending moments when the stylus is deflected by contact with the workpiece, and is thus linked to the maximum possible spring rate for the biassing springs. Taking account of these considerations, this proposed probe requires rather large linear bearings in order to achieve the desired dynamic scanning performance, and thus cannot be built into a small housing. Furthermore, the bearings are subject to an unacceptably high degree of friction.

The present invention seeks to overcome some or all of the above problems. The invention has various aspects, as specified in the appended claims.

BRIEF DESCRIPTION OF THE DRAWINGS

Examples of probes according to the present invention will now be described with reference to the accompanying drawings, wherein.

DESCRIPTION OF THE PREFERRED EMBODIMENTS

Figure 1:
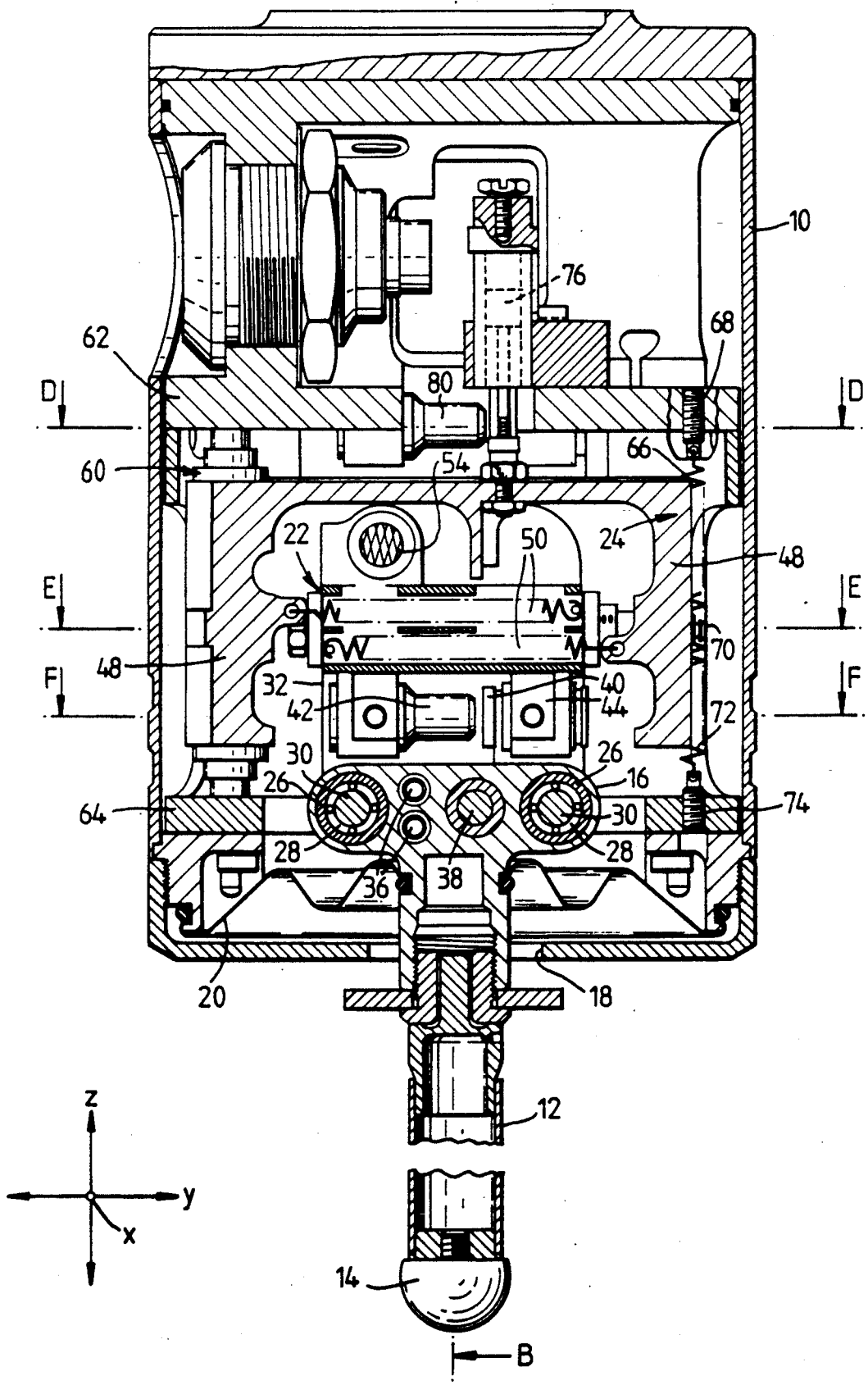
FIG. 1 is a vertical section through a first probe.

Referring to FIGS. 1 to 5, the first probe comprises a housing 10 for mounting in position determination apparatus such as a machine tool or a co-ordinate measuring machine. It has a stylus 12 with a stylus tip 14 for contacting the surface of a workpiece, as the probe is moved relative to the workpiece by the position determination apparatus. Upon contact with the workpiece surface, the stylus 12 is free to move in $\pm x$, $\pm y$ and $\pm z$ directions relative to the housing 10. To this end the stylus 12 is mounted on a suspension system which will now be described.

The stylus 12 is secured in a stylus holder 16 within the housing 10, projecting out through an aperture 18 in the housing. A flexible diaphragm 20 seals the gap between the housing 10 and the stylus holder 16, while at the same time providing no significant hindrance to the x,y,z motion. The stylus holder 16 is slideable in the $\pm x$ direction relative to a first intermediate member 22. The first intermediate member 22 is slideable in the $\pm y$ direction relative to a second intermediate member 24. The second intermediate member 24 is, in turn, slideable in the $\pm z$ direction relative to the housing 10.

The sliding motion between the stylus holder 16 and the first intermediate member 22 is provided as follows. Two parallel sleeves 26 are bonded within respective parallel bores extending in the x direction through the stylus holder 16. A concentric shaft 30 extends through the middle of each sleeve 26. The shafts 30 are fast with the first intermediate member 22 since they extend between depending legs 32 of the member 22 as seen best in FIGS. 2 and 5. The sleeves 26 are slideable over the shafts 30 (to provide x motion of the stylus 12) by means of a cylindrical cage 28 between the shaft 30 and the sleeve 26, the cage 28 trapping a plurality of ball bearings between the shaft and the sleeve. The shaft 30, sleeve 26, ball cage 28 and its associated balls make up a cylindrical linear ball bearing which is a commercially available unit. In the manufacture of the probe, care is taken to ensure that the two linear bearing units are accurately parallel to each other, so that the stylus 12 is free to move in a truly linear fashion in the x direction relative to the stylus holder 16.

The stylus holder 16 is biassed into a null position with respect to the first intermediate member 22 by means of two opposing tension springs 36. Each spring 36 passes through a respective individual bore in the stylus holder 16, parallel to the linear bearing units, and is connected to a respective one of the legs 32 of the member 22.

The stylus holder 16 may also optionally have a damping device 38 located in a further bore, parallel to the linear bearing units, and acting between the stylus holder 16 and one of the legs 32.

Figure 5:
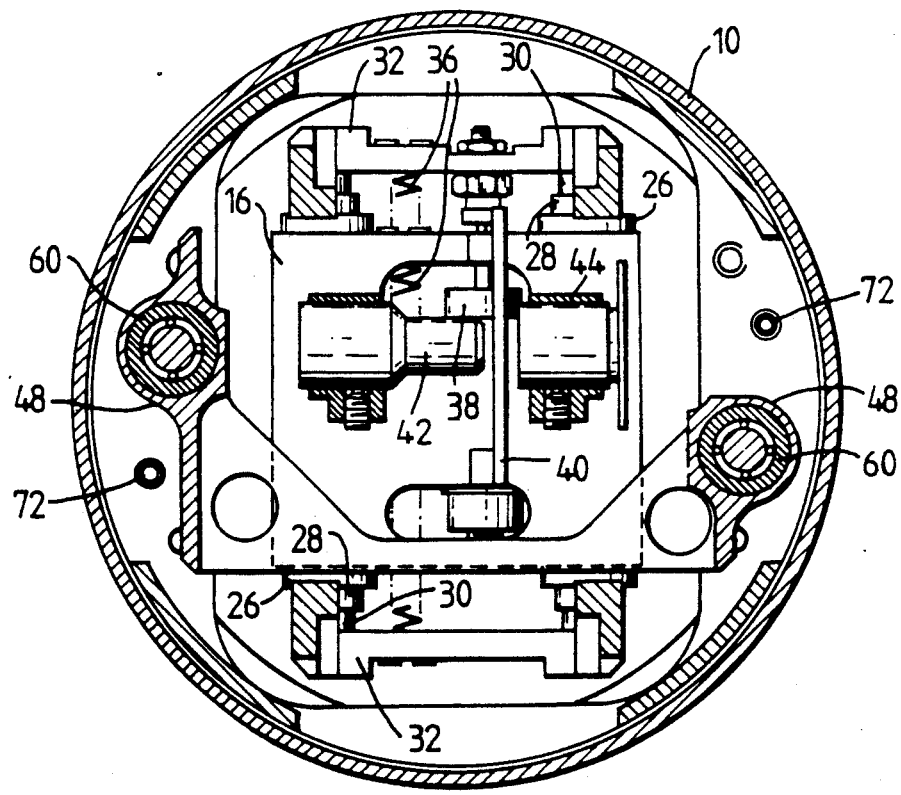
FIG. 5 is a horizontal section on the line F-F in FIG. 1.

A transducer is provided to measure the amount of movement of the stylus holder 16 in the ±x direction. As best seen in FIGS. 1 and 5, this transducer comprises a periodically marked scale 40 extending in the x direction and mounted on the stylus holder 16. Mounted on the first intermediate member 22 is a light emitting diode 42 which illuminates the scale, so that a read head 44, which is also mounted on the member 22, on the opposite side of the scale 40, can detect the passing of the periodic marks on the scale. The construction of the scale and read head may be as described in the U.S. Pat. No. 4,959,542. Of course, different types of transducer can be used if desired, e.g. electromagnetic linear variable displacement transducers (LVDTs).

Figure 2:
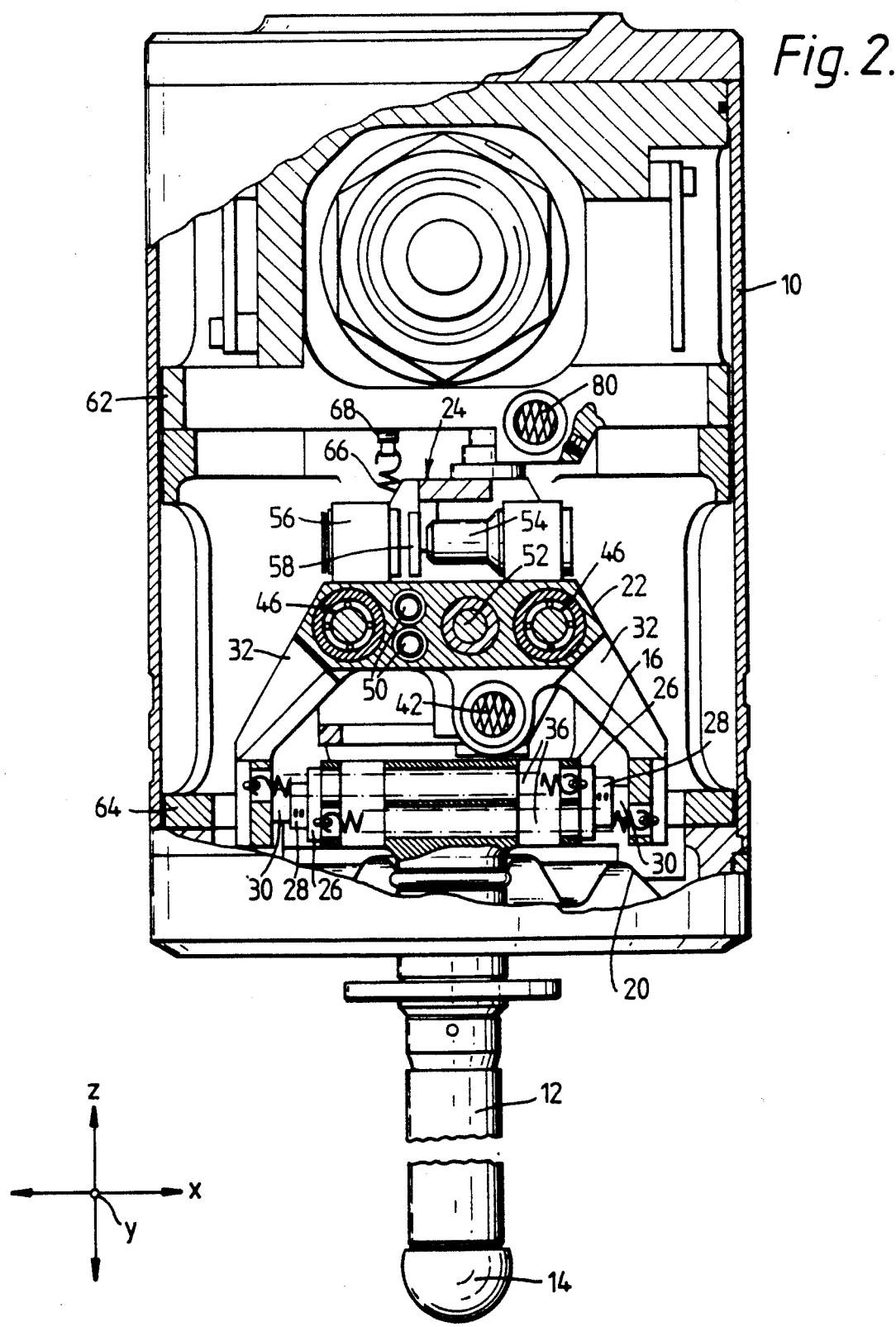
FIG. 2 is a vertical section on the line B-B in FIG. 1.
Figure 3:
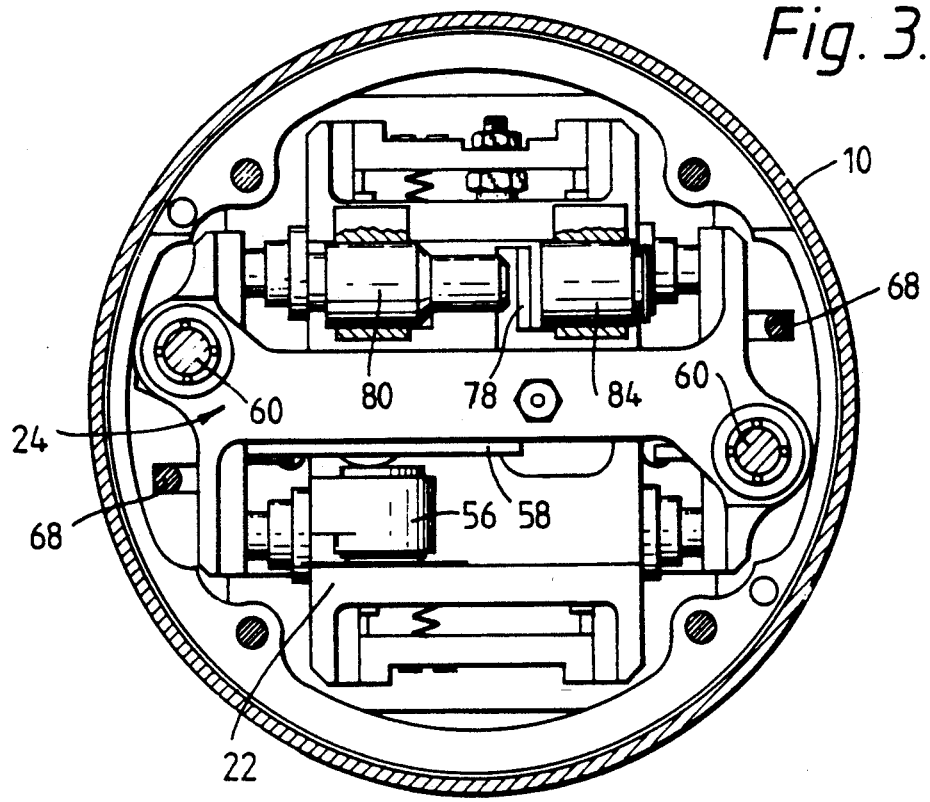
FIG. 3 is a horizontal section on the line D-D in FIG. 1.
Figure 4:
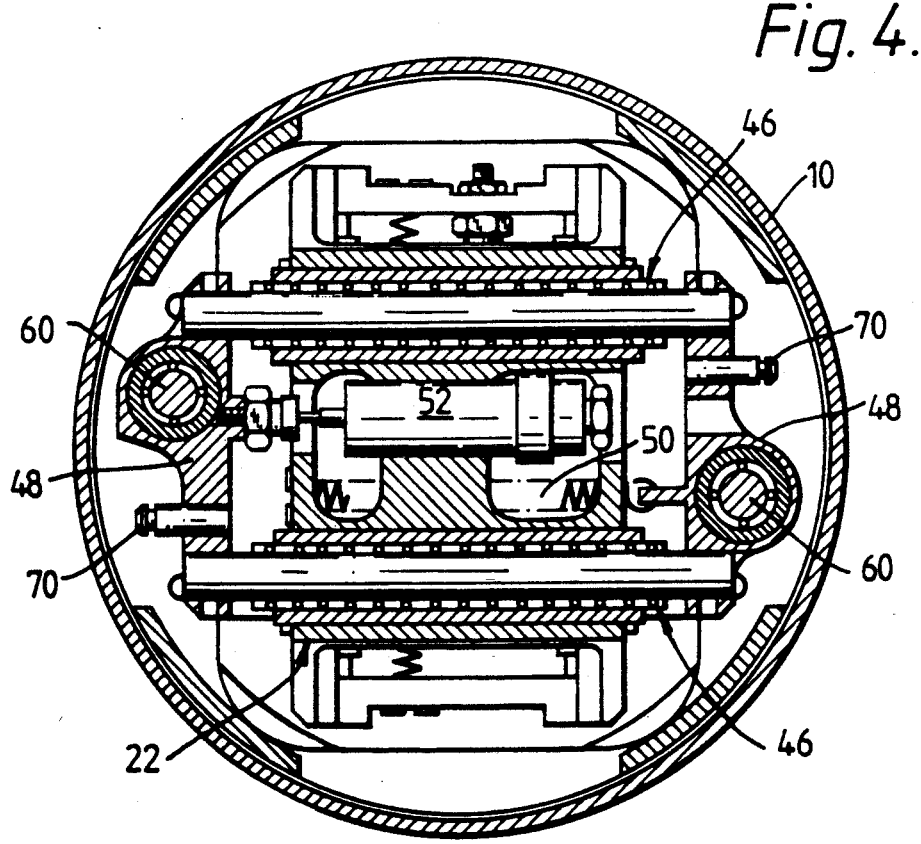
FIG. 4 is a horizontal section on the line E-E in FIG. 1.

The arrangments described above which provide slideability in the ±x direction and measure the movement in that direction, are essentially repeated for the movement in the ±y direction and for the movement in the ±z direction. Thus, the first intermediate member 22 has two parallel linear bearing units 46, constructed identically to the linear bearing units 26,28,30 as seen in FIGS. 2 and 4. The linear bearing units 46 suspend the first intermediate member 22 between sides 48 of the second intermediate member 24, for slideable movement in the ±y direction. As previously, the first intermediate member 22 is biassed into a null position by opposing tension springs 50, each in a respective bore in the member 22, and acting in the ±y directions between the member 22 and a respective one of the sides 48. A damping device 52, similar to the device 38, damps the ±y motion. The ±y movement is measured by means of a light emitting diode 54 and read head 56 mounted on the member 22, co-operating with a scale 58 extending in the y direction on the member 24.

Similarly, the second intermediate member 24 is slideable in the ±z direction by means of two parallel linear bearing units 60. These are located in respective bores in the sides 48 of the member 24, and suspend the member 24 between upper and lower internal flanges 62,64 of the housing 10. As previously, the ±z motion of the member 24 is biassed to a null position by tension springs. Two such springs 66 act between pegs 68 on the upper flange 62 and pegs 70 on the sides 48 of the member 24. Two further such springs 72 act between these pegs 70 and further pegs 74 on the lower flange 64. A damping device 76 acts between the housing 10 and the member 24 in the z direction. A vertically extending scale 78 is mounted on the member 24, and the amount of z movement is measured by co-operation between this scale and a light emitting diode 80 and read head 84 mounted on the upper flange 62.

Figure 6:
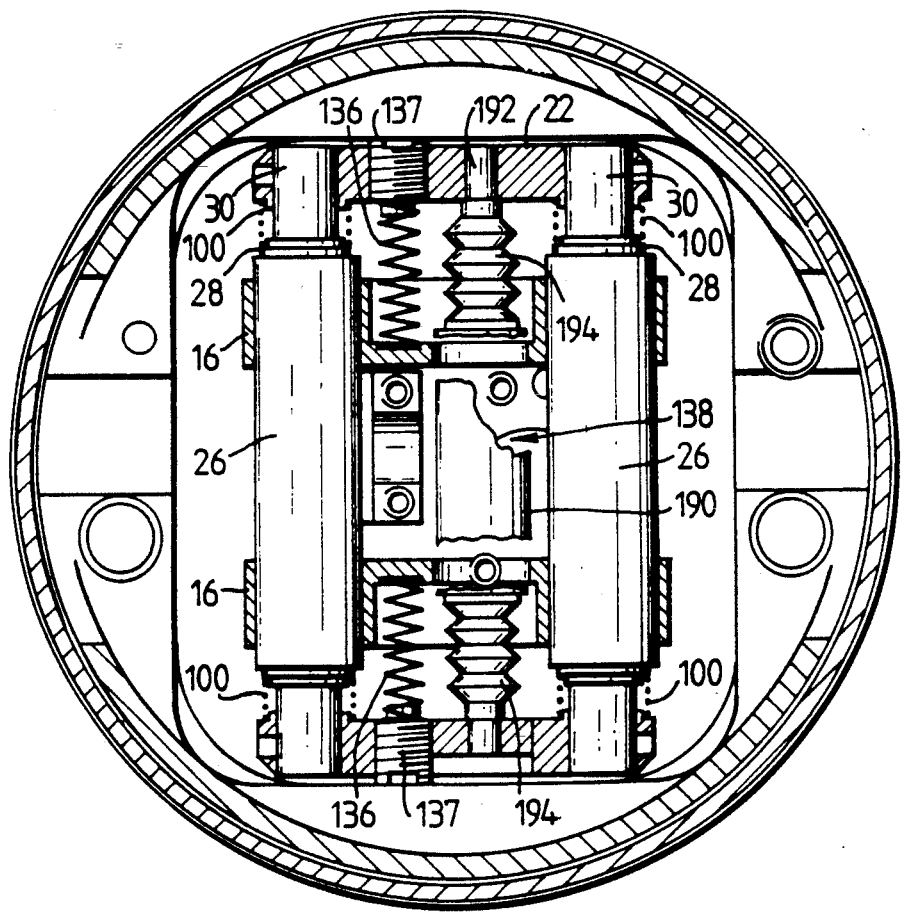
FIG. 6 is a horizontal section through a second probe.

FIG. 6 shows a second example of a probe according to the present invention. In broad outline, this second probe is similar to the first, and similar parts have been given the same reference numbers. The section shown in FIG. 6 is taken at a level corresponding to the level of the linear bearing units 26,28,30 of FIGS. 1 and 2. Thus, FIG. 6 only shows the bearing arrangements between the stylus holder 16 and the first intermediate member 22. However, similar bearing arrangements are provided for the other two orthogonal axes of movement.

As seen in FIG. 6, the linear bearing units 26,28,30 are identical to those of FIGS. 1 to 5, except that light compression springs 100 are provided, acting between the cylindrical cage 28 and the depending legs of the intermediate member 22. These centralise the cage, preventing it from gradually working its way out from between the sleeve 26 and shaft 30 and coming into abutment with the intermediate member 22. The springs 100 have a very light spring rate, so as to have no appreciable effect on the biassing of the stylus holder 16 into its null position.

In place of the tension springs 36 of the previous embodiment, two compression springs 136 are provided between the intermediate member 22 and the stylus holder 16, to bias the stylus holder into its null position. The springs 136 bear against threaded plugs 137 in the respective legs of the intermediate member 22. These provide easy access to the springs 136 so that they can be replaced by springs of a different rating if required. Adjusting the threaded plugs 137 also allows adjustment of the null position of the stylus holder 16.

A damping device 138 comprises a silicone fluid filled cylinder 190, within which is located a piston (not shown). The piston is mounted on a rod 192 which is secured between the legs of the intermediate member 22, and passes through the cylinder 190. The cylinder is sealed around the rod by flexible bellows seals 194. The piston does not touch the cylinder, ensuring low friction, and the fluid within the cylinder provides viscous damping. Like the springs 136, the damper 138 is also removable and can be replaced by a damper of a different rating if desired.

It will be understood that bearing, spring and damper arrangements similar to those just described are provided between the first intermediate member and the second intermediate member, and again between the second intermediate member and the housing, as in the embodiment of FIGS. 1 to 5.

In both the above embodiments, the springs 36,136 and the dampers 38,138 act between the stylus holder 16 and the intermediate member 22, rather than between the stylus holder 16 and the housing. Similarly, the springs and dampers associated with the other horizontal axis act between the first and second intermediate members, not between the first intermediate member and the housing. This means that the springs and dampers for a given axis of motion have no effect whatsoever on the other axes, and cannot cause friction in those axes. Thus, the friction encountered during scanning is reduced, and the overall performance of the probe improved. Furthermore, the arrangement also ensures that the spring rate is equal for all possible directions of stylus deflection in three dimensions, including directions not parallel to the x,y,z axes.

The use of two parallel linear bearing units for each axis of movement of the stylus 12 in the probes described above results in a truly linear movement of the stylus along the given axis, without any tendency to induce unwanted motions on the other axes. The accuracy of the probe is thereby increased.

Furthermore, the use of the cylindrical linear bearings, having an outer sleeve, an inner shaft, and balls trapped in between them, is particularly advantageous.

Obviously, the load capacity of a ball or roller bearing depends upon the number of balls or rollers used. A cylindrical arrangement as described enables the provision of a large number of balls in a relatively small volume, and so it is possible to provide a reaction to the bending moments of the stylus deflections, and to accommodate high rate biassing springs, while still allowing the probe to be of a small size. For example, a practical embodiment of probe according to EP-A-0128561 has a diameter of about 150 mm, whereas practical embodiments of probes according to the present invention have diameters of 84 mm and 40 mm, and give better performance. Because of the capability of the present embodiments for improved stiffness and higher spring rates, the movable part of the probe has a high natural frequency of vibration, around 16 Hz, compared with about 3 Hz for the known Mitutoyo air bearing probe. This enables workpiece surfaces to be scanned with a scanning speed of between 2 and 5 m/min, without the stylus losing contact with the workpiece surface.

Figure 7:
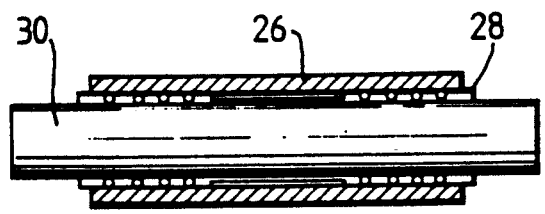
FIG. 7 is a sectional detail of either probe showing a modification.

The ability of the bearings described to provide a reaction to the bending moments, and thus the performance of either of the two probes described, can be improved as shown in FIG. 7. Instead of spacing the balls evenly over the length of the cylindrical linear bearing, they are concentrated in regions at the two ends of the cage 28. This also has the advantage that accurate tolerances are only required in the end regions, so the bearings are easier to manufacture.

Whilst the invention has been described in relation to a three dimensional probe deflectable in three axes x,y,z, it will be understood that the invention also has application in probes which are deflectable in only one or two axes.

We claim:

1. A measurement probe for mounting in a position determining apparatus whereby the probe is movable bodily in space relative to a workpiece, comprising:
   - a probe body having an axis, the probe body being mountable in said position determining apparatus for said movement in space,
   - a stylus for contacting said workpiece, which projects from the probe body in the direction of said axis and which is displaceable relative to the probe body both in the direction of said axis and in at least one direction lateral to said axis,
   - support means for supporting the stylus in said probe body for said displacement in each of said directions,
   - means for measuring the displacement of the stylus relative to the probe body in each of said directions,
   - the support means for supporting the stylus for displacement in the axial direction comprising two linear bearings, each parallel to said axis, and spaced laterally from each other.

2. A probe according to claim 1, wherein each linear bearing comprises two confronting surfaces extending in the axial direction and slideable relative to each other, and rolling elements between said surfaces.

3. A probe according to claim 2, wherein said surfaces are concentric cylindrical surfaces.

4. A probe according to claim 2, wherein said rolling elements are concentrated in two opposing end regions of said surfaces.

5. A probe according to claim 2, wherein the rolling elements are contained in a cage located between said surfaces, and biassing means are provided for centralising the cage in the direction of relative slideable displacement of said surfaces.

6. A probe according to claim 1, wherein the support means for supporting the stylus for displacement in said lateral direction comprises two linear bearings, each parallel to said lateral direction, and spaced from each other.

7. A probe according to claim 6 wherein each linear bearing comprises two confronting surfaces extending in the direction of displacement and slideable relative to each other, and rolling elements between said surfaces.

8. A probe according to claim 7, wherein said surfaces are concentric cylindrical surfaces.

9. A probe according to claim 7, wherein said rolling elements are concentrated in two opposing end regions of said surfaces.

10. A probe according to claim 7, wherein the rolling elements are contained in a cage located between said surfaces, and biassing means are provided for centralizing the cage in the direction of relative slidable displacement of said surfaces.

11. A probe according to claim 6, including a further support means for supporting the stylus for displacement in a second lateral direction perpendicular to the first, said further support means comprising two linear bearings, each parallel to said second lateral direction, and spaced from each other.

12. A measurement probe comprising:
   - a probe body having an axis,
   - a stylus for contacting a workpiece, which projects from the body in the direction of said axis and which is displaceable both in the direction of said axis and in at least one direction lateral to said axis,
   - support means for supporting the stylus for said displacement in each of said directions,
   - means for measuring the displacement of the stylus relative to the body in each of said directions,
   - the support means comprising at least a first intermediate body; first linear bearing means between the first intermediate body and the probe body for supporting the first intermediate body for said axial displacement; and second linear bearing means between the first intermediate body and the stylus for supporting the stylus for displacement in said lateral direction,
   - whereby the first intermediate body is supported for axial but not lateral displacement.

13. A probe according to claim 12, wherein each linear bearing means comprises a pair of cylindrical linear bearings, having confronting concentric cylindrical surfaces which are slideable relative to each other, and rolling elements between said surfaces.

14. A probe according to claim 13, wherein the rolling elements are contained in a cage located between said surfaces, and biassing means are provided for centralizing the cage in the direction of relative slidable displacement of said surfaces.

15. A probe according to claim 12, wherein the support means includes a second intermediate body, supported for said lateral displacement by the second linear bearing means; and a third linear bearing means between the second intermediate body and the stylus, for supporting the stylus for displacement in a second lateral direction perpendicular to the first.

16. A measurement probe for mounting in a position determining apparatus whereby the probe is movable bodily in space relative to a workpiece, comprising:

a probe body having an axis, the probe body being mountable in said position determining apparatus for said movement in space, a stylus for contacting said workpiece, which projects from the probe body in the direction of said axis and which is displaceable relative to the probe body both in the direction of said axis and in two mutually perpendicular directions lateral to said axis, support means for supporting the stylus in said probe body for said displacement in each of said directions, means for measuring the displacement of the stylus relative to the probe body in each of said directions, the support means for supporting the stylus for said displacement in each of said directions comprising two cylindrical linear bearings, parallel to each other and spaced apart from each other, each linear bearing comprising two confronting concentric cylindrical surfaces slideable relative to each other, and rolling elements between said surfaces.

17. A probe according to claim 16, wherein the rolling elements are contained in a cage located between said surfaces, and biassing means are provided for centralizing the cage in the direction of relative slidable displacement of said surfaces.

* * * * *